INVENTOR.
Bobby W. Floyd

Jan. 16, 1962 B. W. FLOYD 3,016,762
ADJUSTABLE REGULATOR FOR DAMPERS
Filed Nov. 9, 1959 2 Sheets-Sheet 2
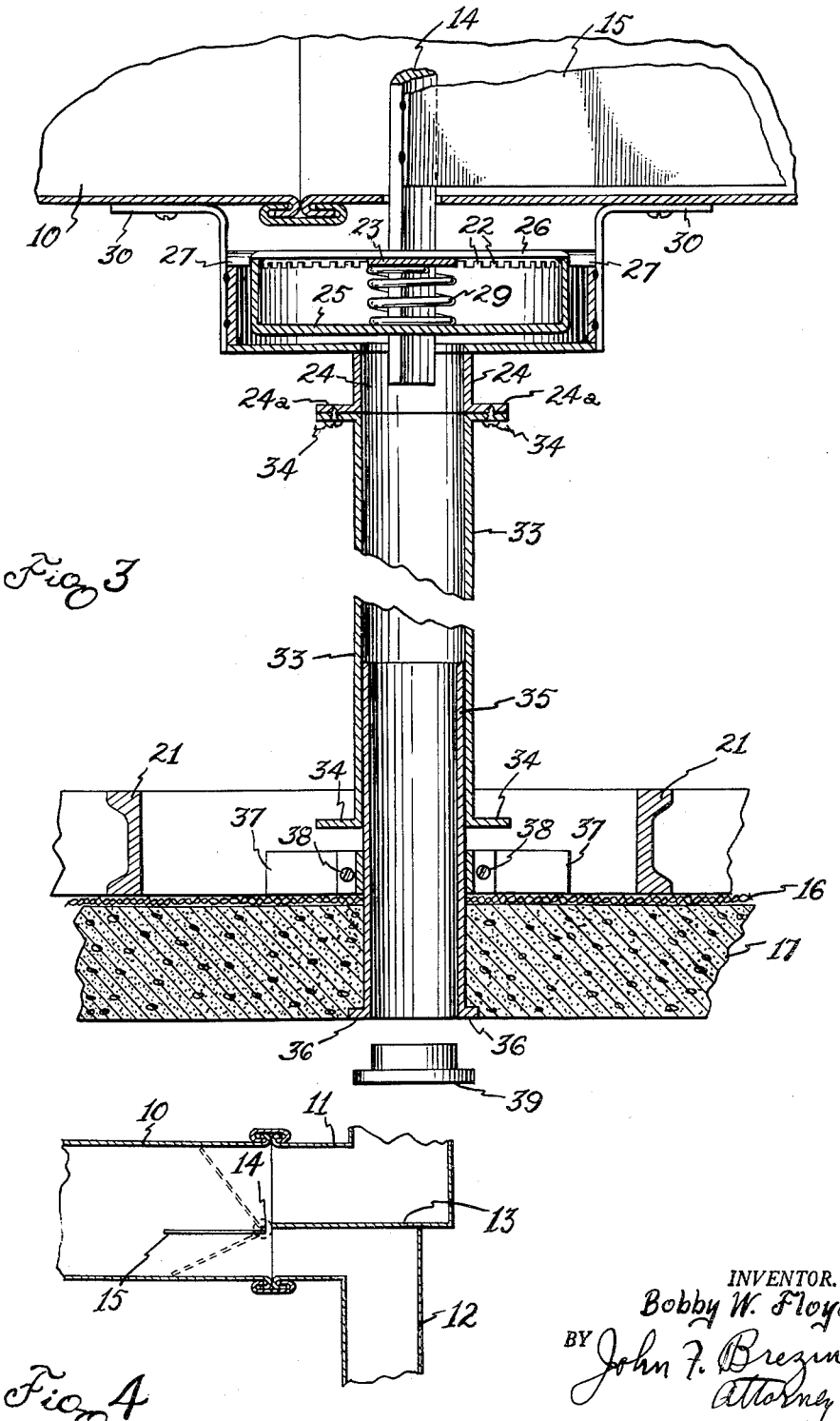
INVENTOR.
Bobby W. Floyd
BY John F. Brezina
Attorney

United States Patent Office 3,016,762
Patented Jan. 16, 1962

3,016,762
ADJUSTABLE REGULATOR FOR DAMPERS
Bobby W. Floyd, 912 Craig Place, Addison, Ill.
Filed Nov. 9, 1959, Ser. No. 851,579
4 Claims. (Cl. 74—527)

My invention is directed to adjustable self-locking regulators or control valves for dampers, air ducts and the like.

It is an important object of my invention to provide adjustable regulators for controlling air flow through dampers and ducts so as to selectively control the volume of air flow through two or more ducts which branch off from another conduit or duct, and which are of a type adapted to be mounted in positions remote and spaced from the faces of ceilings or walls, and which include a depressible spring pressed rotatable member releasably engaging the teeth of a serrated fixed annular rack, said rotatable member being attached to and rotatable with a shaft connected to the control valve or gate.

A further object of my invention is the provision of an adjustable self-locking regulator for the gates and valves of dampers and ducts, which includes a bracket mounted toothed or serrated annular ring, and a rotatable shaft and cross bar whose opposite ends are adapted to releasably seat between the teeth of said serrated ring, said cross bar having a spring for pressing it into seating engagement, said shaft and said cross bar being rotatable together; said shaft being connected to operate a valve or gate within a duct; and said regulator having structural features providing for its mounting in varying positions within ceilings or walls and spaced from the faces of such ceilings or walls; and which said regulators are relatively easy to install and which eliminate any need for threads which normally strip after limited operation, and which firmly hold the valves or gates against rattling. Other and further important objects of my invention will be apparent from the following description and appended claims.

On the drawings:

FIG. 3 is a cross sectional view of a slightly modified form of my regulator illustrating one type of installation thereof where the ceiling is substantially spaced from the ducts.

FIG. 4 is a cross sectional and diagrammatic view on a horizontal plane of a typical main conduit or duct and connecting branch ducts, and illustrating a typical position of the adjustable valve or gate relative thereto.

As shown on the drawings:

Figure 1:
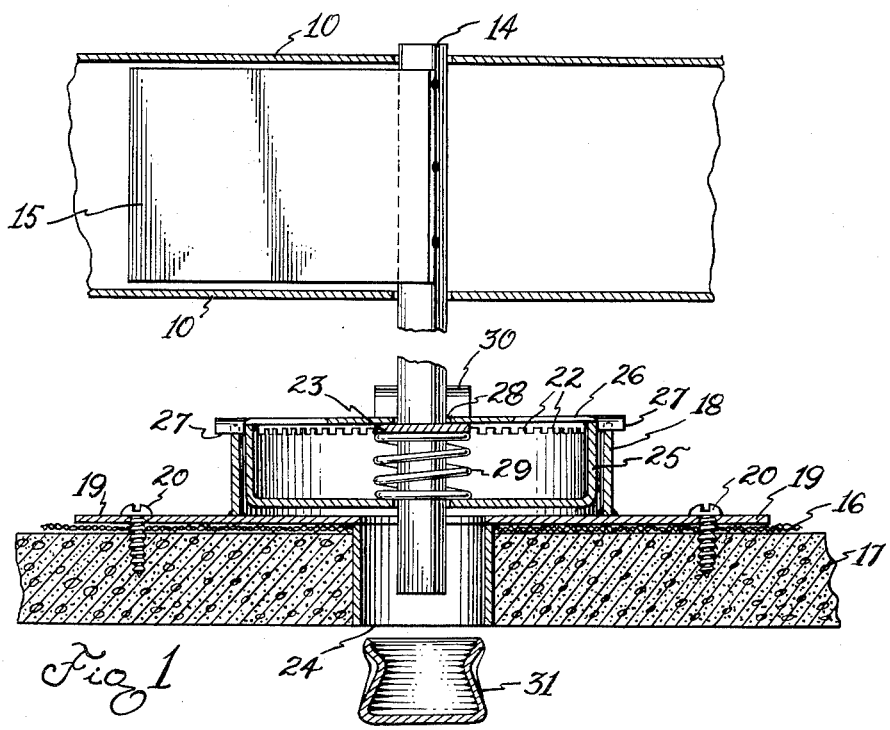
FIG. 1 is a partially cross sectional view of my novel regulator for dampers, with parts of the valve in elevation and showing a segment of a typical wall.

Numeral 10 designates a section on a vertical plane of a conventional air duct for conveying warm or cooled air and which ducts are normally installed in buildings within the framework and above ceilings, under floors and in other concealed and covered locations. Numeral 10 represents a segment of a main duct leading from the source of driven air, and numerals 11 and 12 are segments of two separate branch ducts suitably connected to and leading from the end of the main duct 10 and which are adapted to convey air to separate locations in the building. An intermediate metal wall 13 illustrates the separating wall between sections of said branch ducts 11 and 12. Said ducts are mounted and normally concealed in a ceiling or wall, and are substantially spaced away from the exposed faces of the ceiling, as illustrated in FIGS. 1 and 3.

Figure 2:
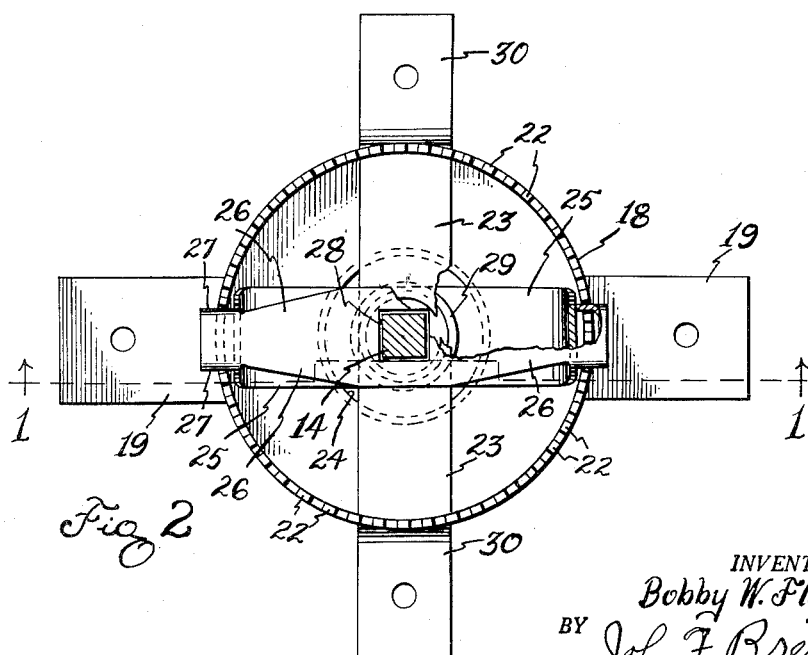
FIG. 2 is a top plan view of my novel regulator, with parts broken away.

Mounted pivotally in two diametrically opposite holes in the duct 10, and adjacent to the wall separating the two branch ducts 11 and 12, is a shaft 14 which is preferably of square cross section and a portion of which extends below the duct as illustrated. Secured, preferably by welding, to the portion of shaft 14 within duct 10 is a metal valve or gate 15 and which is of a size and shape to pivot or swing within duct 10 and to be selectively movable to close or partially close either of the entrance openings into branch ducts 11 and 12, as illustrated in dotted lines in FIG. 2.

Numeral 16 is a cross section of a segment of perforated metal lath on which is mounted a layer or coat of suitable plaster 17, shown in section.

Numeral 18 is an annular cup-like flanged housing or shell which has two integral radial and oppositely extending apertured ears 19. Screws 20 are mounted through the apertures of said ears 19 and engage the metal lath 16 and plaster 17 to secure said housing on the inner face of the metal lath.

The annular outer flange of the housing 18 is serrated and has a plurality of spaced apart teeth 22. As shown in FIGS. 1 and 3 the housing has secured to its serrated edge, preferably welding, at diametrically spaced apart points the opposite ends of a cross bar 23 which is rigid with the housing and which has a central aperture therein through which shaft 14 passes.

Numeral 24 is a cylindrical metal ring or hub secured at one of its ends to the housing 18 and projecting as illustrated, and it normally extends through a hole formed in the lath 16 and plaster layer 17. The non-round end of shaft 14 extends into said hub 24 as illustrated and is adapted to be selectively rotated by a suitable socket wrench.

A metal U-shaped bracket or yoke 25 which has a central non-round hole, corresponding to the non-round shape of shaft 14, is positioned about shaft 14 to extend away from the base of housing 18 and as illustrated in FIGS. 1 and 3. The peripheral edge of said yoke 25 has secured to it by welding or soldering the opposite ends of a diametrically extending metal locking bar 26 whose opposite ends have integral angularly bent extensions or flanges 27 which extend normally downwardly and in a position to seat in the recesses between teeth 22. The metal portion of the transverse locking bar 26 has a hole 28 therein of a size and shape corresponding substantially to the cross section of the shaft 14, so that manual rotation of said shaft will correspondingly rotate said transverse locking bar 26.

A compressible helical expansion spring 29 is mounted with one end against the inner face of the yoke 25 and with its opposite end engaging the middle portion of the stationary cross bar 23, as illustrated in FIGS. 1 and 3.

It will be understood that when it is desired to partially rotate the shaft 14 and selectively adjust and move the valve or gate 15 to the desired position the operator will mount a socket wrench over the end of the shaft 14 within the hub 24 and will press inwardly to cause the inner end of the wrench socket to press against the yoke 25 and against the spring 29, to thereby unseat and disengage the locking flanges 27 from the recesses of the teeth 22, thereupon permitting the operator to partially rotate the shaft 14 and to move the valve or gate 15 to the desired position. When the desired position of the valve 15 is obtained, the operator will release the inward pressure on the wrench and on the yoke 25 to thereby cause a spring-impelled re-seating of the end flanges 27 between the teeth 22 which will cause the valve or gate 15 to be held in the desired set position until a subsequent re-seating thereof.

As indicated in elevation in FIG. 1, a pair of substantially right angled brackets 30 having an aperture in their free ends are secured on the diametrically opposite sides of the housing 18, and provide additional means for securing the regulator to parts of a wall or ceiling in certain types of installation. In all such installations, securance of angular brackets 30 by screws to stationary building parts are to position the regulator in proper alignment with the shaft 14.

Numeral 31 designates a metal cap or plug which has a yieldable edge flange. Said cap 31 is adapted to be releasably and removably mounted in the open end of hub 24.

In FIG. 3 I have illustrated a slightly modified form of my self-locking adjustable device or regulator which is adapted to be mounted in interior spaces within walls or ceilings substantially spaced from the exposed faces of such walls or ceilings. In said FIG. 3, numeral 24a designates an integral angular flange of the ring or hub 24. Numeral 33 designates a metal pipe or tube which has apertured annular flanges 34 at its opposite ends. Said tube 33 is secured to flange 24a by suitable screws 34 as illustrated.

Numeral 35 designates an outer metal tube having an annular end flange 36 and which said tube is of smaller circumference than tube 33. The tube 35 is normally mounted through a passage in the plaster layer 17 and in the metal lath 16 and is positioned so that its outer end will be flush with the exposed face of the plaster layer 17. A two piece arcuate sheet metal clamp 37 is preferably secured about the intermediate portion of the tube 35 by suitable screws 38 and adjacent the metal lath 16, as illustrated in FIG. 3. Said clamp 37, which has its middle portions of arcuate shape, securely holds the tube 35 in the desired position so as to maintain its outer end flush with the plaster layer 17.

The said metal lath 16 and plaster layer 17 are adapted to be suitably secured, for example by wire, to the trusses 21 which form part of the building wall.

The outer end portion of the tube 35 is preferably smooth, and a metal plug 39 is adapted to be frictionally mounted in said end of said tube 35 to close the opening of said tube, as illustrated in FIG. 3.

As many changes could be made in the above construction, and as many apparently widely different embodiments of my invention within the scope of the claims could be constructed without departing from the spirit and scope thereof, it is intended that all matter contained in the accompanying specification shall be interpreted as illustrative and not in a limiting sense.

I claim:

1. In an adjustable device for adjusting damper valves, a cup-shaped housing; apertured brackets for securing said housing; a plurality of teeth on the periphery of said housing; a transverse apertured mounting bar secured diametrically across said housing; a U-shaped centrally passaged yoke; a diametrically extending locking member secured to said yoke, and having extensions engageable with said teeth; a spring between said yoke and said transverse apertured mounting bar; a shaft extending through and having a non-rotating connection with said locking member and through said spring and said housing and projecting from said housing in both directions; said yoke and said locking member being depressible to disengage said locking member and permit rotation of said shaft; said shaft being adapted to be connected to a movable damper valve.

2. An adjustable regulating and locking device for damper valves comprising a metal ring having serrations on one of its edges; an angular metal apertured cross bar secured to the middle portions of said ring and mounted on said ring; an apertured metal locking bar having end extensions seatable in said serrations; a rectangular apertured yoke secured to one face of said locking bar; a shaft mounted for common rotation in said yoke aperture and in said locking bar and projecting in opposite directions therefrom; an expansion spring about said shaft and between said yoke and said cross bar and adapted to normally press said locking bar to seat said locking bar extensions in said serrations; said locking bar and yoke and said shaft being selectively rotatable when said serrations are disengaged.

3. In an adjustable locking device for dampers or the like, a metal housing open on one end; brackets for securing said housing to a stationary support; a diametrical strap connecting the opposite edges of said housing; said strap and said housing having aligned apertures therein; a shaft of substantially rectangular cross section extending through the apertures of said housing and of said strap; a metal passaged yoke in said housing; a locking bar secured to and across said yoke; a plurality of teeth on the edge of said housing; the opposite ends of said locking bar projecting radially and being adapted to engage said teeth; a tubular extension connected to and extending from the apertured portion of said housing; the passage in said locking bar corresponding substantially to the cross sectional shape of said shaft; a compression spring between said yoke and said strap; said yoke being adapted to be pressed against the action of said spring to disengage the teeth of said locking bar to permit rotation of said shaft and relocking thereof.

4. In an adjustable device for locking damper valves, an annular passaged cup-like member having a serrated edge; a passaged cross bar connecting the opposite edges of said cup-like member; apertured brackets for securing said cup-like member to a support; a passaged metal yoke having a cross arm, said cross arm having a pair of outward extensions normally engaging said serrated edge; a non-round shaft extending through said member, through said cross bar, and cooperatively through the passage in said cross arm yoke; and a spring between said yoke and said cross bar; said yoke being movable to disengage said extensions from said serrated edge and permit rotation of said shaft and a releasable holding thereof in desired positions; said shaft being adapted to open and close a movable damper valve.

References Cited in the file of this patent

UNITED STATES PATENTS

| | | |
|---|---|---|
| 590,940 | Ayer | Sept. 28, 1897 |
| 1,716,277 | Messmer | June 4, 1929 |
| 2,011,254 | Nightingale | Aug. 13, 1935 |
| 2,348,860 | Siedle | May 16, 1944 |
| 2,545,988 | Bobrick | Mar. 20, 1951 |
| 2,676,604 | Senna | Apr. 27, 1954 |
| 2,704,466 | Way | Mar. 22, 1955 |
| 2,841,034 | Greene | July 1, 1958 |
| 2,849,891 | Mills | Sept. 2, 1958 |
| 2,883,879 | Etzenhouser | Apr. 28, 1959 |

FOREIGN PATENTS

| | | |
|---|---|---|
| 7,191 of 1907 | Great Britain | Mar. 26, 1908 |